(12) United States Patent
Chen et al.

(10) Patent No.: US 9,652,553 B2
(45) Date of Patent: May 16, 2017

(54) METHOD AND DEVICE FOR DISPLAYING A WEB PAGE

(71) Applicant: Alibaba Group Holding Limited, George Town (KY)

(72) Inventors: Junwen Chen, Hangzhou (CN); Junjun Pan, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 217 days.

(21) Appl. No.: 14/323,764

(22) Filed: Jul. 3, 2014

(65) Prior Publication Data
US 2015/0019956 A1   Jan. 15, 2015

(30) Foreign Application Priority Data
Jul. 12, 2013 (CN) .......................... 2013 1 0293720

(51) Int. Cl.
*G06F 17/00* (2006.01)
*G06F 17/30* (2006.01)
*G06F 17/21* (2006.01)
*G06F 17/25* (2006.01)
*G06F 17/10* (2006.01)
(Continued)

(52) U.S. Cl.
CPC ...... *G06F 17/30905* (2013.01); *G06F 17/212* (2013.01); *G06F 17/30896* (2013.01); *G06F 17/10* (2013.01); *G06F 17/21* (2013.01); *G06F 17/211* (2013.01); *G06F 17/2247* (2013.01); *G06F 17/25* (2013.01); *G06F 17/3089* (2013.01); *G06F 17/30864* (2013.01); *G06F 17/30893* (2013.01); *G06F 17/30899* (2013.01);
(Continued)

(58) Field of Classification Search
CPC ................. G06F 17/211; G06F 17/212; G06F 17/30896; G06F 17/30902; G06F 17/25; G06F 17/21; G06F 17/30899; G06F 17/3089; G06F 17/2247; G06F 17/30893; G06F 17/30864; G06F 21/00; G06F 17/30905
USPC ....... 715/200, 700, 230, 240, 238, 273, 243, 715/254
See application file for complete search history.

(56) References Cited

U.S. PATENT DOCUMENTS 7,657,064 B1   2/2010   Conwell
8,296,808 B2   10/2012  Hardacker et al.
(Continued)

FOREIGN PATENT DOCUMENTS

JP    H09168027    6/1997

*Primary Examiner* — Quoc A Tran
(74) *Attorney, Agent, or Firm* — Van Pelt, Yi & James LLP

(57) ABSTRACT

Embodiments of the present application relate to a method for displaying a web page, a system for displaying a web page, and a computer program product for displaying a web page. A method for displaying a web page is provided. The method includes pre-processing text information to be picture processed in a web page, creating a picture, generating a position description for each text block in the picture, filling the corresponding text blocks into the picture based on the position descriptions, generating a call address for the picture, and correspondingly saving the call address and the position description of each text block as metadata. If an access request for the web page is received, invoking the metadata, loading the picture, selecting at least one corresponding text block from the picture, and displaying the at least one text block is performed.

17 Claims, 9 Drawing Sheets

(51) Int. Cl.
    *G06F 17/22*     (2006.01)
    *G06F 21/00*     (2013.01)
(52) U.S. Cl.
    CPC ........ *G06F 17/30902* (2013.01); *G06F 21/00* (2013.01)

(56) References Cited

U.S. PATENT DOCUMENTS

| | | | |
|---|---|---|---|
| 8,910,036 B1* | 12/2014 | Cromwell | H02M 3/33592 715/234 |
| 2004/0194028 A1* | 9/2004 | O'Brien | G06F 17/211 715/247 |
| 2010/0275152 A1* | 10/2010 | Atkins | G06F 17/212 715/788 |
| 2015/0278181 A1* | 10/2015 | Gevlich | G06F 3/04817 715/730 |

* cited by examiner

100

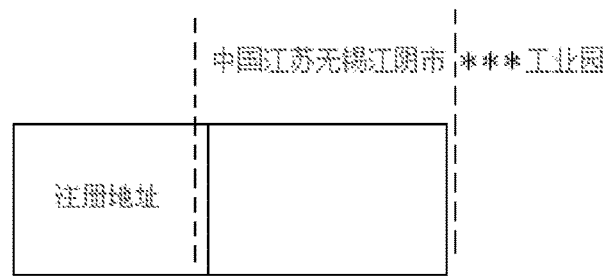
FIG. 3A
中国江苏无锡江阴市 2003年06月 2012年(最近)
有限责任公司(自然人投资或控股) ＊＊＊工业园
FIG. 3B
| 公司名称 | | 注册地址 | 中国江苏无锡江阴市 ＊＊＊工业园 |
| 注册资本 | | 成立日期 | 2003年06月 |
| 注册号 | | 法定代表人 | |
| 登记机关 | | 企业类型 | 有限责任公司(自然人投资或控股) |
| 营业期限 | | 年检时间 | 2012年(最近) |
| 经营范围 | | 申请人信息 | 姓名：  职位： |
FIG. 3C
中国江苏无锡江阴市 ＊＊＊工业园 2003年06月
有限责任公司(自然人投资或控股) 2012年(最近)
FIG. 3D

600

| The fields in the table are: | |
|---|---|
| Registration Location | China, Guandong, Guanzhou, Tianhe District Chepitaian South No. 96 Apartment A26-A7 |
| Date Established | 2/5/2013 |
| Representative | Xiongyi Jiang |
| Type of Company | |
| Annual Inspection | Not Applicable |

FIG. 8

METHOD AND DEVICE FOR DISPLAYING A WEB PAGE

CROSS REFERENCE TO OTHER APPLICATIONS

This application claims priority to People's Republic of China Patent Application No. 201310293720.7 entitled A PICTURE PROCESSING-BASED WEB PAGE DISPLAY METHOD AND WEB PAGE DISPLAY DEVICE, filed Jul. 12, 2013 which is incorporated herein by reference for all purposes.

FIELD OF THE INVENTION

The present application relates to a method and device for displaying a web page.

BACKGROUND OF THE INVENTION

In the Internet age, information is nearly limitless. Methods involving acquiring information have undergone changes, from flipping through a book, looking up a word in a dictionary, or conducting searches via search engines.

Today, there is so much information that differentiating or selecting a piece of information can be difficult. Therefore, many conventional methods are used to automatically capture data on the Internet, automatically differentiate the data, and analyze the data. Based on automatic keyword identification techniques, information to be used is selected from vast quantities of information.

Conventionally, "web page data capture" involves acquiring web page data using web crawlers or similar tools and then extracting useful data from the acquired web page data using program analysis. Part of what conventional search engines do is extracting web page data. As an example of a web page data extraction, a program extracts a news headline from a news channel of Sina.com.

On the other hand, many companies now are preventing their online information from being acquired by others. In other words, companies are preventing other organizations or individuals from obtaining unauthorized data via web page data acquisition technology. For example, product divisions of some companies have discovered that authenticated commercial licensing information on their own company websites have appeared on other non-company websites. The product divisions of these companies have deduced that the commercial licensing information was acquired via a web crawler or similar tools. Such illicit acquisition of the information of others without consent of the authorizing party or owner is illegal. However, owners have no choice other than disclosing this information on the Web in order to make public their lawful status.

Therefore, to prevent the capture of information disclosed on the Web by web crawlers or other such tools, some websites have adopted a text-to-picture processing method. In this way, the websites can prevent web crawlers or other such tools from capturing information disclosed on their websites.

However, in the above text-to-picture processing method, when a page has many "text pictures" to be displayed, browsers, regardless of type, will have to issue many Hypertext Transfer Protocol (HTTP) requests to display the text pictures (one request per picture). The issuing of the many HTTP requests has a large impact on front-end performance of page display.

In summary, picture processing of text used to hinder web crawlers or other such tools from capturing information disclosed on the web also causes a slowdown in browsers when displaying web pages having many pictures.

BRIEF DESCRIPTION OF THE DRAWINGS

Various embodiments of the invention are disclosed in the following detailed description and the accompanying drawings.

The drawings described here are intended to further the understanding of the present application, and they constitute a part of the present application. The illustrative embodiments of the present application and the descriptions thereof are intended to explain the present application and do not constitute inappropriate limitations of the present application. Among the drawings:

FIG. 3A is an example of a web page display position.

FIG. 3B is an example of a picture of text-filled blocks.

FIG. 3C is a diagram of another example of a web page display position.

FIG. 3D is a diagram of another example of a picture of text-filled blocks.

FIG. 8 is a diagram of an example of a display frame.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
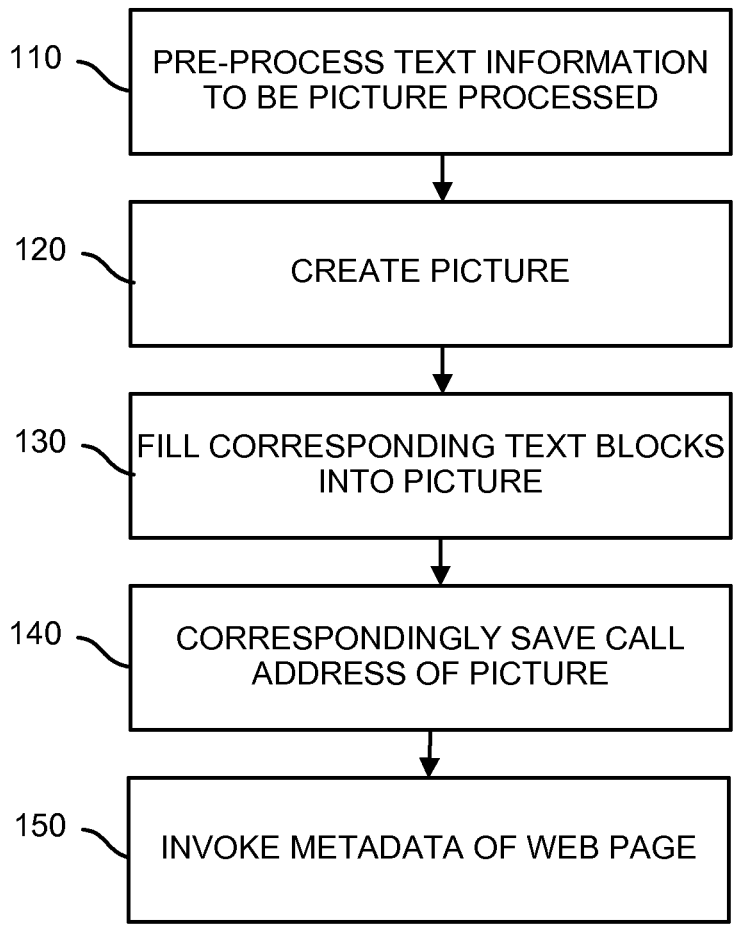
FIG. 1 is a flow chart of an embodiment of a process for displaying a web page.

FIG. 1 is a flow chart of an embodiment of a process for displaying a web page. In some embodiments, the process 100 is implemented by a server 620 of FIG. 6 and comprises:

In 110, the server pre-processes text information to be picture processed in a web page to be displayed. The pre-processing of the text information includes setting up display frames in the web page and splitting the text information into text blocks based on the display frames.

FIG. 8 is a diagram of an example of a display frame. A display frame refers to a display style of text on a web page. Properties such as the display style include whether the text is bold, whether the text is italicized, the text's line height, etc. The display style aids in determining how much a text block occupies on the web page. The display frame is also referred to as a display block.

Blocks within the webpage for displaying text often have limits on line height and line width. The browser will do string segmentation on the blocks based on the line width automatically. For example, "Apartment A26-A7" of FIG. 8 is automatically displayed in the next line. But when using pre-generated pictures, pre-segmentation needs to be performed based on character style and other properties to specify the amount of text string that the line width can accept, and to segment the text ahead of time.

The setting up of a display frame in a web page comprises identifying display positions of text information in the web page and setting a maximum line width of display frames according to widths of the display positions of the text information.

In some embodiments, heights of the display frames responsively match a line height of a single line of the text information. The line height of the text block is determined based on the display position of the text block, and different line heights mean generated text blocks require different amounts of space to be reserved above or below a text block. The reserved space above or below the text block is to match the amount of space automatically reserved by the browser.

In some embodiments, line width of the text information is less than or equal to a maximum line width of the display frames, and heights of the text blocks are equal to the line height of a single line of the text information. Web page display frames all have width limitation. When a browser processes text, the browser automatically adjusts the lines of text. However, for text images, the lines have to be adjusted at the time the image is generated.

In some embodiments, the splitting of the text information includes splitting text information having a natural semantic significance, yet the text to be segmented into text blocks can be unrelated to natural semantics. Dimensions of the text blocks are based on dimensions of the display frames. However, the display frames are related to the display positions of the text information on the web page. Therefore, the splitting of the text information is performed for more convenient storage and display.

Referring back to FIG. 1, in 120, the server creates a picture and generates a position description for each text block in the picture.

One reason to create the picture ahead of time is to avoid having to repeatedly create the picture, and also the picture can be stored (e.g., on a content distribution network (CDN)) to increase performance. The process for creating the picture includes a process of taking multiple text blocks of different sizes and filling the text blocks appropriately into a blank picture. To create the picture, the blank picture having a certain length and width is specified so that all the text blocks can fit within the blank picture. In some embodiments, for each text block to be filled in the picture, relative coordinates for the upper left hand corner of the text block relative to the picture are used. These relative coordinates correspond to the position description. The coordinates are used as a position of the text blocks within the whole picture when the web page is displayed.

In 130, the server fills the corresponding text blocks into the picture based on the corresponding position descriptions, saves the filled picture, and generates a call address for the picture.

In some embodiments, the server generates a Uniform Resource Locator (URL) as the call address.

In 140, the server correspondingly saves the call address of the picture and the position description of each text block in the picture as metadata for the web page.

In 150, when receiving an access request for the web page, the server invokes the web page metadata, loads the picture based on the call address in the web page metadata, selects the corresponding text blocks from the picture based on the position descriptions in the metadata for the web page, and displays the text blocks in the corresponding display positions in the web page.

If, when the server receives an access request for the web page, the metadata for the web page cannot be found, the server skips to and executes operation 110 to generate the metadata for the web page and displays the web page.

In some embodiments, the metadata includes: a call address or link for visiting the picture or image formed from operation 120 and a length and a width, an offset, or a combination thereof in the picture described above.

Figure 2A:
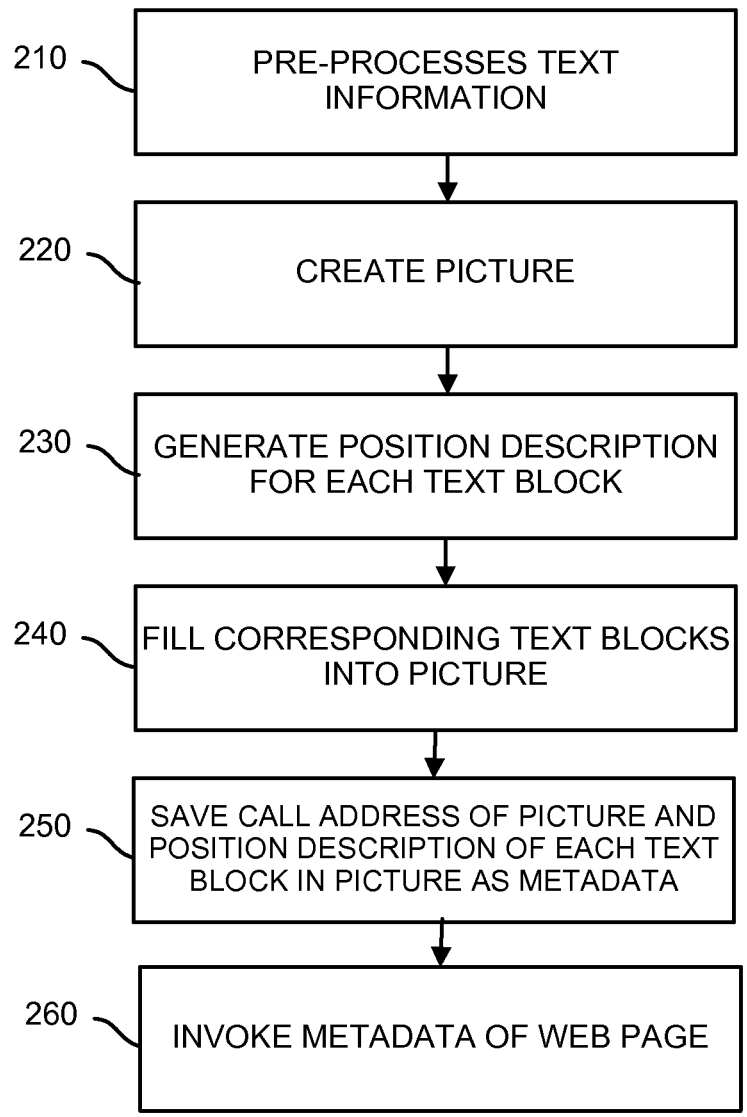
FIG. 2A is a flow chart of another embodiment of a process for displaying a web page.

FIG. 2A is a flow chart of another embodiment of a process for displaying a web page. In some embodiments, the process 200 is implemented by a server 620 of FIG. 6 and comprises:

In 210, the server pre-processes text information to be picture processed.

Figure 2B:
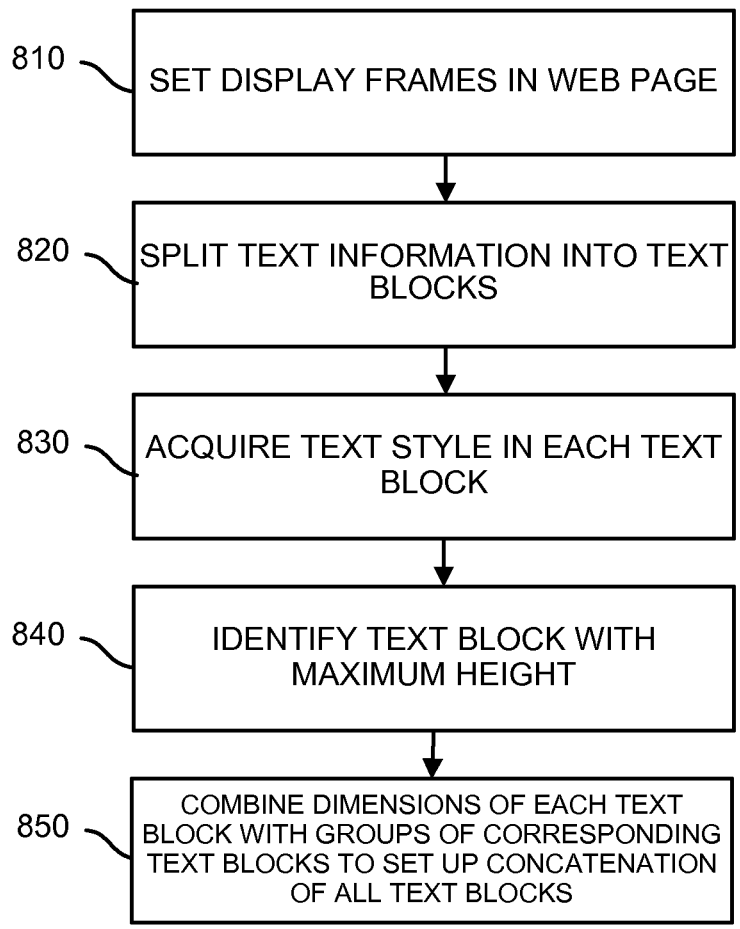
FIG. 2B is a flow chart of an embodiment of a process for preprocessing text information to be picture processed.

FIG. 2B is a flow chart of an embodiment of a process for preprocessing text information to be picture processed in a web page to be displayed. In some embodiments, the process 800 is implemented by a server 620 of FIG. 6 and comprises:

In 810, the server sets display frames in the web page.

In 820, the server splits the text information into text blocks according to the display frames.

In some embodiments, the setting up of the display frames comprises: identifying display positions of the text information in the web page, and setting the maximum line width of the display frames according to widths of the display positions. In some embodiments, a height of the display frames responsively matches a line height of a single line of the split text information. A display position refers to a display block and represents a block within a web page. The block has a width limit since it is a part of the web page. Typically, portions of text exceeding the web page are to be ignored (or not displayed) or there would be a line change.

Please note that not all the widths of the text blocks are necessarily equal to the maximum width. In some embodiments, the widths vary as a result of different numbers of characters in each text block and different text styles.

Therefore, the widths of the text blocks are smaller than or equal to the maximum line width, and the height of the text blocks is equal to the height of a single line of the split text information.

Although each text block is a single line, each text block can have different text styles, and the different text styles can have different sizes. Thus, dimensions of each text block can be different which complicates the task of filling a picture with text blocks. Therefore, in some embodiments, all text blocks are to be streamlined using operations 830 and 840 below.

In 830, the server acquires a text style in each text block and calculates dimensions of each text block according to the text style in each text block.

In some embodiments, a text style is specified when a text block is formed, and the text style is stored as configuration information. Also, line height and line width are specified when a web page is programmed.

The text styles include font, font size, line height, bold or not, italics or not, colored font, background color, or any combination thereof.

In 840, the server identifies the text block with a maximum height, selects a fraction of the height of the text block with the maximum height as a threshold, and groups the various text blocks based on the threshold and the height of the text block with the maximum height.

In some embodiments, padding is performed to more reasonably lay out the text blocks in the picture by making the picture occupy a small storage space. Since the text blocks have different sizes, the technique first stores the largest text block, then stores smaller (more problematic) blocks. In this technique, all the text blocks are analyzed to obtain the largest text block or to order text blocks by size.

In some embodiments, one or more of the thresholds are selected. For example, the thresholds include: "Line height of text block with maximum height," "Line height of text block with maximum height/2," "Line height of text block with maximum height/4," "Line height of text block with maximum height/8," etc. Of course, the thresholds are not limited to these examples. By using the ranges defined by these thresholds (e.g., ranges of (maximum height/8, maximum height/4], (maximum height/4, maximum height/2], etc.), the various text blocks are divided into several groups. Text blocks within any single group will have heights within the range of that group.

By grouping and then concatenating the text blocks, the exterior shape of the concatenation of the text blocks becomes more regular and closer to a rectangle. Because pictures used for filling are typically rectangular, the picture-filling space utilization ratio can thus be maximized and the quantity of created and saved pictures can be reduced. This grouping and concatenating of the text blocks reduces the storage space used on servers.

In 850, the server combines the dimensions of each text block with the groups of corresponding text blocks to set up a concatenation of all the text blocks and allocates the dimensions of each text block for a picture that accommodates all text blocks based on the concatenation of all the text blocks.

Referring back to FIG. 2A, in 220, the server creates the picture according to the dimensions allocated for a picture that accommodates all text blocks.

In 230, the server generates a position description for each text block in the picture. In other words, the server positions boundaries of each text block in the picture based at least in part on: the dimensions of the picture, the concatenation of all the text blocks, and the dimensions of each text block; and generates a position description for each text block based on the boundaries of each text block.

In 240, the server fills the corresponding text blocks into the picture based on the position descriptions, saves the filled picture, and generates a call address (e.g., a URL) for the picture.

In 250, the server correspondingly saves the call address of the picture and the position description of each text block in the picture as metadata for the web page.

For example, the picture is stored in a file server, and the call address and the positions of the text block are all stored as metadata in a persistent cache (e.g., stored in leveldb).

In 260, when receiving an access request for the web page, the server invokes the metadata of the web page, loads the picture according to the call address in the metadata of the web page, and selects the corresponding text blocks from the picture based on the position descriptions in the metadata in the web page and the text blocks in the corresponding display positions in the web page are displayed.

When an access request is received for the web page, the web page is opened and the picture is loaded. Code for the corresponding display positions on the web page is read and executed, and the metadata corresponding to the web page is automatically invoked.

If, when the access request is received for the web page, the server cannot find the metadata for the web page, then the server skips to and performs operation 210 to generate the metadata for the web page and displays the web page.

In some embodiments, the actual operation of setting up display frames and splitting the text information into text blocks based on the display frames are implemented through Java's original application programming interface "LineBreakMeasurer" class. The implementation is described below using an application example.

FIG. 3A is an example of a web page display position. FIG. 3B is an example of a picture of text-filled blocks.

As in FIG. 3A, Chinese text information to be displayed in a web page is "中国江苏 无锡江阴市 * 工业园 [China, Jiangsu, Wuxi, Jiangyin City*Industrial Park]." The maximum width for identifying the web page display position is insufficient for displaying "中国江苏无锡 江阴市 * 工业园 [China, Jiangsu, Wuxi, Jiangyin City*Industrial Park]." The Chinese text information is to be divided into two lines to be displayed.

A "LineBreakMeasurer" class is used to calculate the display position maximum width so as to make the cut to include the position of the "市 [City]" character in "中国江苏无 锡江阴市 * 工业园" If the cut-off position is not appropriate—if, for example, the cut does not include a complete character, then the cut-off position is fine-tuned to accommodate the complete character. Typically, the cut-off depends on a display area's width where an excess portion causes a line break. For the string 中国江苏无 锡江阴市 * 工业园, the display area's width was reached at the character 市. Subsequently, the cut-off was made. Finally, the appropriate maximum line width for the display frame is selected.

As shown in FIG. 3B, display frames are set up based on this maximum line width and the line height of "中国江苏无 锡江阴市 * 工业园." The display frames are used to divide "中国江苏无 锡江阴市 * 工业园" into two separate text blocks: "中国江苏无 锡江阴市" and "*** 工业园." In some embodiments, the cut-off of a line is determined based on the maximum line width of a display frame.

Both operations 150 of FIG. 1 and 260 of FIG. 2A include selecting the corresponding text blocks from the picture based on the position descriptions in the metadata of the web page and displaying the text blocks in the corresponding display positions in the web page. In some embodiments, the actual operation of the selecting of the corresponding text blocks from the picture is implemented through a Cascading Style Sheet (CSS) technique.

An example is provided below to describe how the CSS technique is used to implement the selecting of the corresponding text blocks from the picture. In this example, the display uses a CSS offset technique, which specifies a picture and then displays different text blocks of the picture in different positions on the web page, so the text blocks are downloaded together and the number of transfers is reduced.

FIG. 3C is a diagram of another example of a web page display position. FIG. 3D is a diagram of another example of a picture of text-filled blocks.

In the example shown in FIG. 3D, a picture is entitled "text-image-pic1."

In the example shown in FIG. 3C, a position description of the text block "中国江 苏无锡江阴市 *** 工业园" (marked with a black border) in this picture is "-0px-22px;width: 179px;height:22px." The unit "px" corresponds to pixel.

When a web page access request is received, the web page is opened and pictures are loaded. A code for the corresponding display position "注册地址 [Registered Address]" on the web page is read, and the corresponding metadata for the web page is invoked based on the code. "text-image-pic1" is loaded according to the call address in the metadata for the web page.

Moreover, the text block with the position description "-0px -22px;width:179px;height:22px" is extracted from the picture "text-image-pic1" using CSS. The extraction using CSS refers to a mechanism provided by CSS based on coordinates (e.g., width and length) to only display a portion of a picture. The extracted text block "中国江苏无锡江阴市 ***工业园" is to be displayed. The CSS code below is used to place the text block at a specified position in the web page. This text block is displayed at the display position that corresponds to "注册地址" [Registered Address] in the web page.

An example of the CSS code for displaying the text block is:

```
<p class="text-image-pic1" style="display:inline-block;
   vertical-align:middle;background-position:-0px -22px;
   width:179px;height:22px;">
</p>
```

Different text blocks in the picture are extracted and displayed using the code described above. It is understood that other forms of coding can be employed by one of ordinary skill and further discussions of coding are omitted for conciseness.

Figure 4:
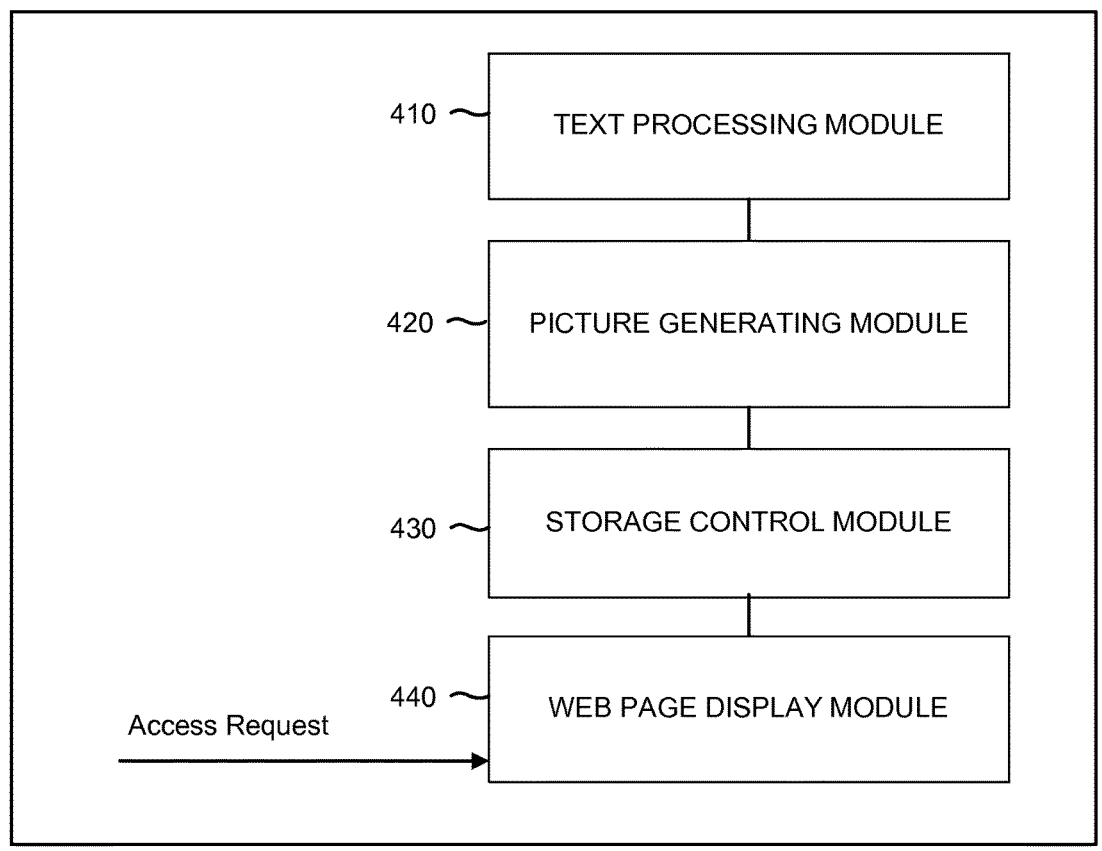
FIG. 4 is a structural diagram of an embodiment of a device for displaying a web page.

FIG. 4 is a structural diagram of an embodiment of a device for displaying a web page. In some embodiments, the device 400 implements the processes 100 of FIG. 1 or 200 of FIG. 2A and comprises: a text processing module 410, a picture generating module 420, a storage control module 430, and a web page display module 440.

In some embodiments, the text processing module 410 pre-processes text information to be picture processed in a web page. In some embodiments, the pre-processing of the text information comprises: setting up display frames and splitting the text information into text blocks based on the display frames. When setting up the display frames, the text processing module 410 identifies display positions of the text information in the web page, and sets a maximum line width of the display frames based on widths of the display positions. In some embodiments, the height of the display frames responsively matches a line height of a single line of the split text information. In some embodiments, the line widths of the text blocks are less than or equal to the maximum line width, and the heights of the text blocks are equal to the line height of the single line of the split text information.

In some embodiments, the picture generating module 420 creates a picture and generates a position description for each text block in the picture, fills the corresponding text blocks into the picture based on the position descriptions, saves the filled picture, and generates a call address for the picture. When creating the picture, the picture generating module 420 creates the picture based on dimensions allocated by the text processing module 410 for a picture that accommodates all text blocks. When generating the position descriptions, the picture generating module 420 positions boundaries of each text block in the picture based on the dimensions of the picture, the concatenation of all the text blocks, and the dimensions of each text block, and the picture generating module 420 generates a position description for each text block based on the boundaries of each text block.

In some embodiments, the storage control module 430 correspondingly saves the call address of the picture and the position description of each text block in the picture as metadata for the web page.

In some embodiments, the web page display module 440, when receiving an access request for the web page, invokes the metadata for the web page, loads the picture based on the call address in the metadata for the web page, selects the corresponding text blocks from the picture based on the position descriptions in the metadata of the web page, and displays the text blocks in the corresponding display positions in the web page.

Figure 5:
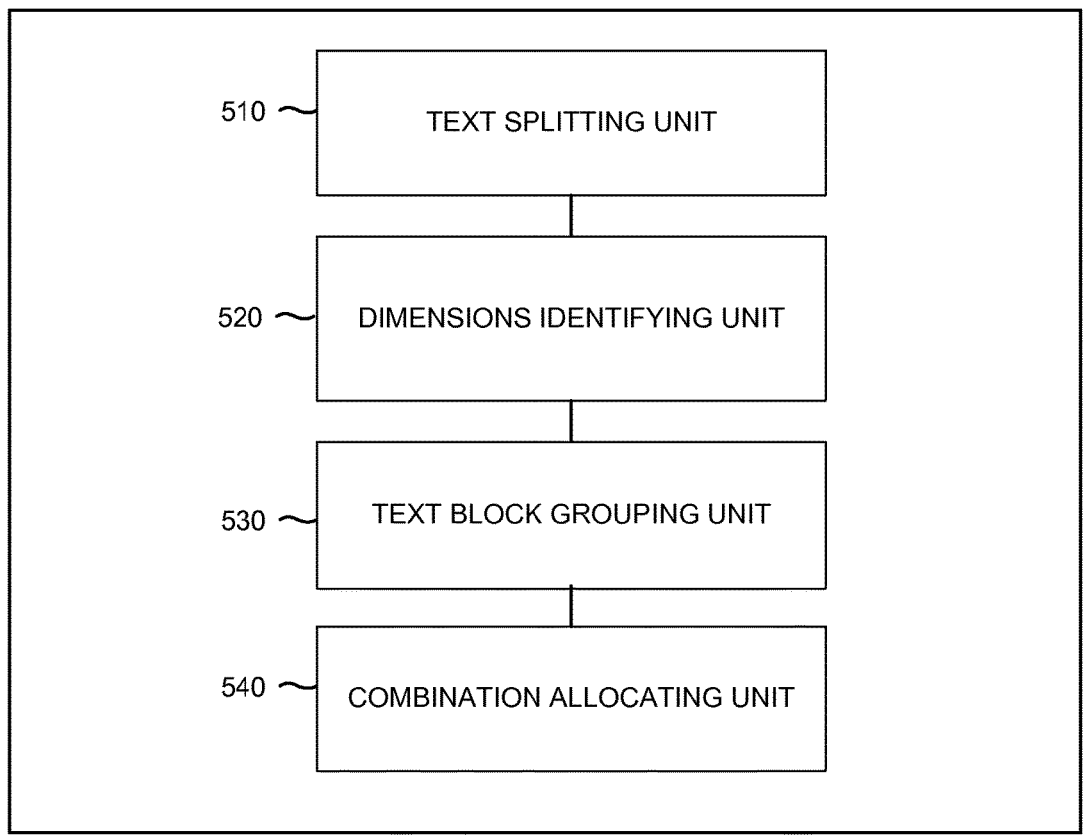
FIG. 5 is a structural diagram of an embodiment of a text processing module.

FIG. 5 is a structural diagram of an embodiment of a text processing module. In some embodiments, the text processing module 500 is an implementation of the text processing module 410 of FIG. 4 and comprises: a text splitting unit 510, a dimensions identifying unit 520, a text block grouping unit 530, and a combination allocating unit 540.

In some embodiments, the text splitting unit 510 sets up display frames and splits text information to be picture processed into text blocks based on the display frames.

In some embodiments, the dimensions identifying unit 520 acquires a text style in each text block and calculates dimensions of each text block based on the text style in each text block. The text styles acquired by the dimensions identifying unit 520 comprise: font, font size, line height, bold or not, italics or not, colored font, background color, or any combination thereof.

In some embodiments, the text block grouping unit 530 identifies a text block with a maximum height, selecting a fraction of the height of the text block with the maximum height as a threshold, and groups the various text blocks based on the threshold and the height of each text block.

In some embodiments, the combination allocating unit 540 combines the dimensions of each text block with the groups of corresponding text blocks to set up a concatenation of all the text blocks, and allocates dimensions for a picture that accommodates all text blocks based on the concatenation.

Figure 6:
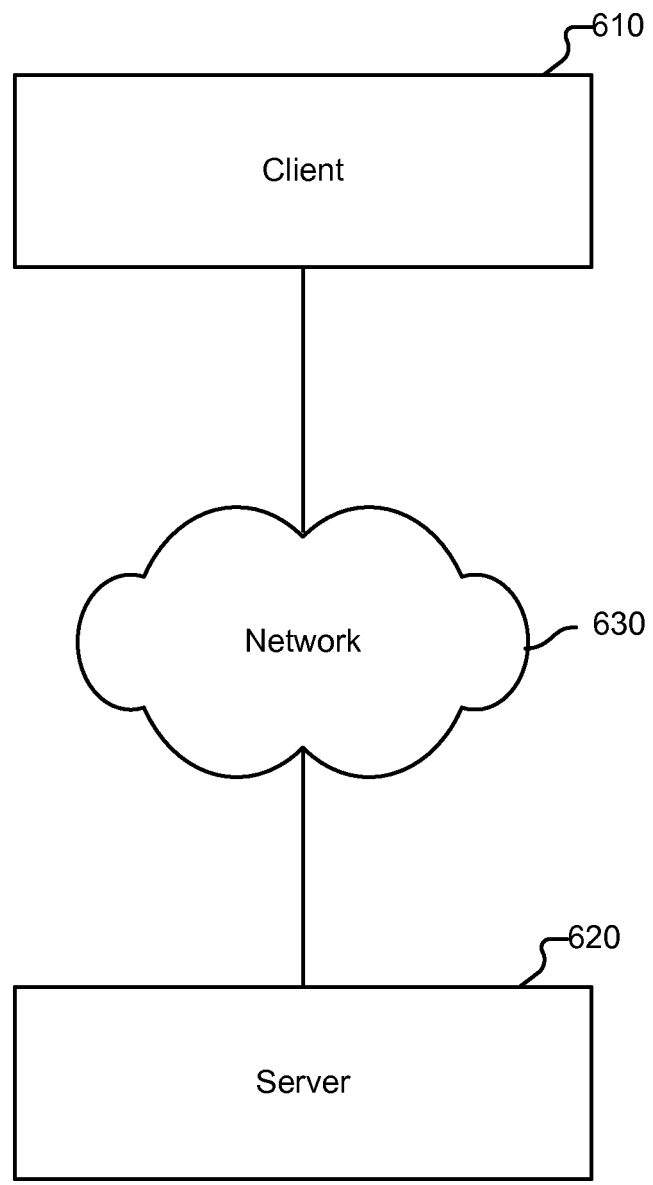
FIG. 6 is a diagram of an embodiment of a system for displaying a web page.

FIG. 6 is a diagram of an embodiment of a system for displaying a web page. In some embodiments, the system 600 includes a server 620 for displaying a web page connected to a client 610 via a network 630. The client 610 sends an access request for a web page to the server 620.

Figure 7:
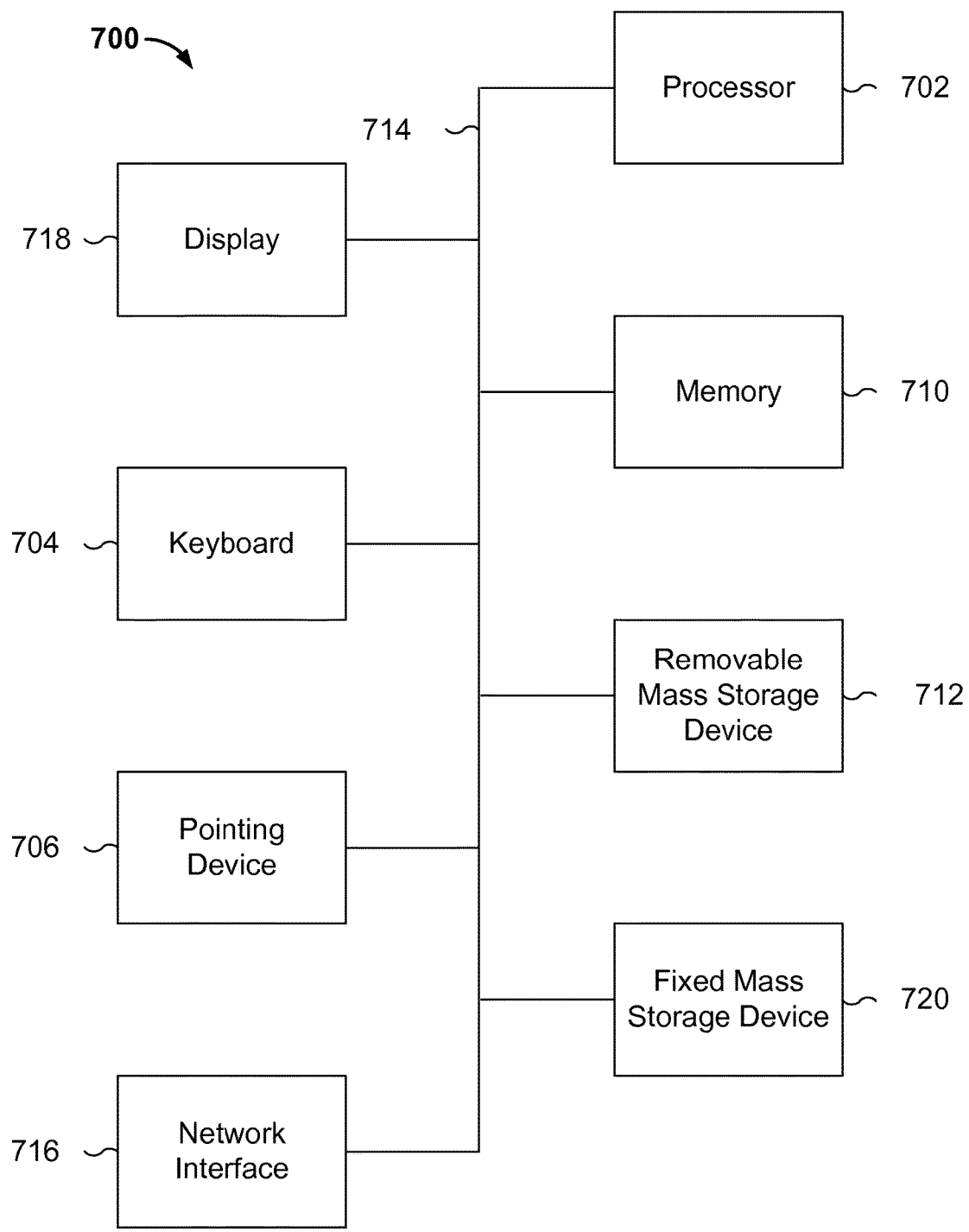
FIG. 7 is a functional diagram illustrating an embodiment of a programmed computer system for displaying a web page.

FIG. 7 is a functional diagram illustrating an embodiment of a programmed computer system for displaying a web page. As will be apparent, other computer system architectures and configurations can be used to display a web page. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage 712, 720 generally store additional programming instructions, data, and the like that typically are not in active use by the processor 702. It will be appreciated that the information retained within mass storage 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for displaying a web page, comprising:
pre-processing text information to be picture processed in a web page, wherein the pre-processing of the text information comprises:
setting up display frames, the display frames relating to display positions of the text information;
splitting the text information into text blocks based on the display frames;
grouping the text blocks based on a threshold and a height of at least one text block,
combining dimensions of the at least one text block with groups of corresponding text blocks to set up a concatenation of all the text blocks, the dimensions being calculated based on a text style in the at least one text block; and
allocating dimensions for a picture that accommodates the text blocks based on the concatenation;
creating the picture;
generating a plurality of position descriptions for corresponding text blocks in the picture;
filling the corresponding text blocks into the picture based on the position descriptions of the text blocks;
saving the filled picture;
correspondingly saving a call address of the picture and the position description of each text block in the picture as metadata for the web page; and
in the event that an access request for the web page is received:
invoking the metadata for the web page;
loading the picture based on the call address in the metadata for the web page;
selecting at least one corresponding text block from the picture based on at least one position description in the metadata for the web page; and
displaying the at least one text block in at least one display position in the web page.

2. The method as described in claim 1, wherein:
the setting up of the display frames comprises:
identifying the display positions of text information in the web page; and
setting a maximum line width of the display frames based on widths of the display positions, height of the display frames responsively matching a line height of a single line of the text information.

3. The method as described in claim 2, wherein:
line widths of the text blocks are less than or equal to the maximum line width of the display frames, and heights of the text blocks are equal to the line height of the single line of the text information.

4. The method as described in claim 1, wherein:
the pre-processing of the text information further comprises:
identifying a text block with a maximum height; and
selecting a fraction of a height of the text block with the maximum height as the threshold.

5. The method as described in claim 4, wherein the creating of the picture comprises creating the picture based on the dimensions allocated for the picture that accommodates the text blocks.

6. The method as described in claim 4, wherein:
the generating of the position description for each text block in the picture comprises:
positioning boundaries of each text block in the picture based on the dimensions for the picture, the concatenation of all the text blocks, and the dimensions of each text block; and
generating the position description for each text block based on the boundaries of each text block.

7. The method as described in claim 4, wherein the text style comprises: font, font size, line height, bold or not, italics or not, colored font, background color, or any combination thereof.

8. The method as described in claim 1, wherein:
a text block is placed within a corresponding predefined position in the picture; and
the call address corresponds to a Uniform Resource Locator (URL).

9. A device for displaying a web page, comprising:
at least one processor configured to:
pre-process text information to be picture processed in a web page, wherein the pre-processing of the text information comprises:
set up display frames, the display frames relating to display positions of the text information;
split the text information into text blocks based on the display frames;
group the text blocks based on a threshold and a height of at least one text block;
combine dimensions of the at least one text block with groups of corresponding text blocks to set up a concatenation of all the text blocks, the dimensions being calculated based on a text style in the at least one text block; and
allocate dimensions for a picture that accommodates the text blocks based on the concatenation;
create the picture;
generate a plurality of position descriptions for corresponding text blocks in the picture;
fill the corresponding text blocks into the picture based on the position descriptions of the text blocks;
save the filled picture;
correspondingly save a call address of the picture and the position description of each text block in the picture as metadata for the web page; and
in the event that an access request for the web page is received:
invoke the metadata for the web page;
load the picture based on the call address in the metadata for the web page;
select at least one corresponding text block from the picture based on at least one position description in the metadata for the web page; and
display the at least one text block in at least one display position in the web page; and
a memory coupled to the at least one processor and configured to provide the at least one processor with instructions.

10. The device as described in claim 9, wherein:
the setting up of the display frames comprises:
identify the display positions of text information in the web page; and
set a maximum line width of the display frames based on widths of the display positions, height of the display frames responsively matching a line height of a single line of the text information.

11. The device as described in claim 10, wherein:
line widths of the text blocks are less than or equal to the maximum line width of the display frames, and heights of the text blocks are equal to the line height of the single line of the text information.

12. The device as described in claim 9, wherein:
the pre-processing of the text information further comprises:

identify a text block with a maximum height; and
select a fraction of a height of the text block with the maximum height as the threshold.

13. The device as described in claim 12, wherein the creating of the picture comprises creating the picture based on the dimensions allocated for the picture that accommodates the text blocks.

14. The device as described in claim 12, wherein:
the generating of the position description for each text block in the picture comprises:
position boundaries of each text block in the picture based on the dimensions for the picture, the concatenation of all the text blocks, and the dimensions of each text block; and
generate the position description for each text block based on the boundaries of each text block.

15. The device as described in claim 12, wherein the text style comprises: font, font size, line height, bold or not, italics or not, colored font, background color, or any combination thereof.

16. A computer program product for displaying a web page, the computer program product being embodied in a tangible non-transitory computer readable storage medium and comprising computer instructions for:
pre-processing text information to be picture processed in a web page, wherein the pre-processing of the text information comprises:
setting up display frames, the display frames relating to display positions of the text information;
splitting the text information into text blocks based on the display frames;
grouping the text blocks based on a threshold and a height of at least one text block;
combining dimensions of the at least one text block with groups of corresponding text blocks to set up a concatenation of all the text blocks, the dimensions being calculated based on a text style in the at least one text block; and
allocating dimensions for a picture that accommodates the text blocks based on the concatenation;
creating the picture;
generating a plurality of position descriptions for corresponding text blocks in the picture;
filling the corresponding text blocks into the picture based on the position descriptions of the text blocks;
saving the filled picture;
correspondingly saving a call address of the picture and the position description of each text block in the picture as metadata for the web page; and
in the event that an access request for the web page is received:
invoking the metadata for the web page;
loading the picture based on the call address in the metadata for the web page;
selecting at least one corresponding text block from the picture based on at least one position description in the metadata for the web page; and
displaying the at least one corresponding text block in at least one display position in the web page.

17. A method for displaying a web page, comprising:
pre-processing text information to be picture processed in the web page, wherein the pre-processing of the text information comprises:
setting up display frames, the display frames relating to display positions of the text information;
splitting the text information into text blocks based on the display frames;
creating a picture;
acquiring a text style in each text block;
calculating dimensions of each text block based on the text style in each text block;
identifying the text block with a maximum height;
selecting a fraction of a height of the text block with the maximum height as a threshold;
grouping the various text blocks based on the threshold and a height of each text block;
combining the dimensions of each text block with the groups of corresponding text blocks to set up a concatenation of all the text blocks; and
allocating dimensions for the picture that accommodates all text blocks based on the concatenation;
generating a position description for each text block in the picture;
filling the corresponding text blocks into the picture based on the position descriptions of the text blocks, wherein a predefined position of a text block is placed within a corresponding position in the picture, the predefined position of the text block corresponding to a corner of the text block;
saving the filled picture;
correspondingly saving a call address of the picture and the position description of each text block in the picture as metadata for the web page, wherein the call address corresponds to a Uniform Resource Locator (URL); and
in the event that an access request for the web page is received:
invoking the metadata for the web page;
loading the picture based on the call address in the metadata for the web page;
selecting at least one corresponding text block from the picture based on at least one position description in the metadata for the web page; and
displaying the at least one text block in at least one display position in the web page.

* * * * *